United States Patent
Gurin

(10) Patent No.: US 8,616,323 B1
(45) Date of Patent: Dec. 31, 2013

(54) HYBRID POWER SYSTEMS

(75) Inventor: Michael H. Gurin, Glenview, IL (US)

(73) Assignee: Echogen Power Systems, Akron, OH (US)

(*) Notice: Subject to any disclaimer, the term of this patent is extended or adjusted under 35 U.S.C. 154(b) by 662 days.

(21) Appl. No.: 12/722,125

(22) Filed: Mar. 11, 2010

Related U.S. Application Data

(60) Provisional application No. 61/209,760, filed on Mar. 11, 2009.

(51) Int. Cl.
*B60K 6/00* (2006.10)
*B60K 25/10* (2006.10)

(52) U.S. Cl.
USPC .......................................... 180/305; 180/165

(58) Field of Classification Search
USPC ................... 180/65.1, 65.21, 165, 305, 307
See application file for complete search history.

(56) References Cited

U.S. PATENT DOCUMENTS

| | | | |
|---|---|---|---|
| 2,575,478 A | 11/1951 | Wilson |
| 2,634,375 A | 4/1953 | Guimbal |
| 2,691,280 A | 10/1954 | Albert |
| 3,095,274 A | 6/1963 | Crawford |
| 3,105,748 A | 10/1963 | Stahl |
| 3,237,403 A | 3/1966 | Feher |
| 3,277,955 A | 10/1966 | Laszlo |
| 3,401,277 A | 9/1968 | Larson |
| 3,622,767 A | 11/1971 | Koepcke |
| 3,736,745 A | 6/1973 | Karig |
| 3,772,879 A | 11/1973 | Engdahl |

(Continued)

FOREIGN PATENT DOCUMENTS

| | | |
|---|---|---|
| CA | 2794150 (A1) | 9/2011 |
| CN | 202055876 U | 11/2011 |

(Continued)

OTHER PUBLICATIONS

Alpy, N., et al., "French Atomic Energy Commission views as regards SCO2 Cycle Development priorities and related R&D approach" Symposium on SCO2 Power Cycles, Apr. 29-30, 2009, Troy, NY, 20 pages.

(Continued)

*Primary Examiner* — J. Allen Shriver, II
*Assistant Examiner* — Bridget Avery
(74) *Attorney, Agent, or Firm* — Edmonds & Nolte, PC

(57) ABSTRACT

The present invention generally relates to hybrid power systems for vehicles. In one embodiment, the present invention relates to hybrid power systems for various types of transportation vehicles where the hybrid power systems is partially, or even totally, based on the use of at least one hydraulic system to provide supplemental, or even the primary, motion power for a hybrid vehicle. In another embodiment, the hybrid power systems of the present invention are capable of providing both motion power as well as cabin comfort heating and/or cooling. In still another embodiment, a hybrid vehicle according to the present invention comprises a power generating system and passenger cabin comfort system, wherein the power generating system comprises a thermodynamic working fluid (FA) in a first thermodynamic cycle (C1), a pump (P1), a motor (M1), a high pressure accumulator, a low pressure reservoir, and at least one heat exchanger, wherein the thermodynamic working fluid (FA) is concurrently operable to create either vehicle motion through the motor (M1) or electricity through a generator and is operable to create passenger cabin cooling or heating through the expansion or contraction of the thermodynamic working fluid (FA).

16 Claims, 7 Drawing Sheets

(56) References Cited

U.S. PATENT DOCUMENTS

| | | |
|---|---|---|
| 3,791,137 A | 2/1974 | Jubb |
| 3,939,328 A | 2/1976 | Davis |
| 3,971,211 A | 7/1976 | Wethe |
| 3,982,379 A | 9/1976 | Gilli |
| 3,998,058 A | 12/1976 | Park |
| 4,009,575 A | 3/1977 | Hartman, Jr. |
| 4,029,255 A | 6/1977 | Heiser |
| 4,030,312 A | 6/1977 | Wallin |
| 4,049,407 A | 9/1977 | Bottum |
| 4,070,870 A | 1/1978 | Bahel |
| 4,099,381 A | 7/1978 | Rappoport |
| 4,119,140 A | 10/1978 | Cates |
| 4,152,901 A | 5/1979 | Munters |
| 4,164,848 A | 8/1979 | Gilli |
| 4,164,849 A | 8/1979 | Mangus |
| 4,182,960 A | 1/1980 | Reuyl |
| 4,183,220 A | 1/1980 | Shaw |
| 4,198,827 A | 4/1980 | Terry |
| 4,208,882 A | 6/1980 | Lopes |
| 4,221,185 A | 9/1980 | Scholes |
| 4,233,085 A | 11/1980 | Roderick |
| 4,248,049 A | 2/1981 | Briley |
| 4,257,232 A | 3/1981 | Bell |
| 4,287,430 A | 9/1981 | Guido |
| 4,336,692 A | 6/1982 | Ecker |
| 4,347,711 A | 9/1982 | Noe |
| 4,347,714 A | 9/1982 | Kinsell |
| 4,372,125 A | 2/1983 | Dickenson |
| 4,384,568 A | 5/1983 | Palmatier |
| 4,391,101 A | 7/1983 | Labbe |
| 4,420,947 A | 12/1983 | Yoshino |
| 4,428,190 A | 1/1984 | Bronicki |
| 4,433,554 A | 2/1984 | Rojey |
| 4,439,687 A | 3/1984 | Wood |
| 4,439,994 A | 4/1984 | Briley |
| 4,448,033 A | 5/1984 | Briccetti |
| 4,450,363 A | 5/1984 | Russell |
| 4,455,836 A | 6/1984 | Binstock |
| 4,467,609 A | 8/1984 | Loomis |
| 4,467,621 A | 8/1984 | O'Brien |
| 4,475,353 A | 10/1984 | Lazare |
| 4,489,562 A | 12/1984 | Snyder |
| 4,489,563 A | 12/1984 | Kalina |
| 4,498,289 A | 2/1985 | Osgerby |
| 4,516,403 A | 5/1985 | Tanaka |
| 4,549,401 A | 10/1985 | Spliethoff |
| 4,555,905 A | 12/1985 | Endou |
| 4,558,228 A | 12/1985 | Larjola |
| 4,573,321 A | 3/1986 | Knaebel |
| 4,578,953 A | 4/1986 | Krieger |
| 4,589,255 A | 5/1986 | Martens |
| 4,636,578 A | 1/1987 | Feinberg |
| 4,674,297 A | 6/1987 | Vobach |
| 4,694,189 A | 9/1987 | Haraguchi |
| 4,700,543 A | 10/1987 | Krieger |
| 4,756,162 A | 7/1988 | Dayan |
| 4,765,143 A | 8/1988 | Crawford |
| 4,773,212 A | 9/1988 | Griffin |
| 4,798,056 A | 1/1989 | Franklin |
| 4,813,242 A | 3/1989 | Wicks |
| 4,821,514 A | 4/1989 | Schmidt |
| 4,986,071 A | 1/1991 | Voss |
| 4,993,483 A | 2/1991 | Harris |
| 5,000,003 A | 3/1991 | Wicks |
| 5,050,375 A | 9/1991 | Dickinson |
| 5,098,194 A | 3/1992 | Kuo |
| 5,164,020 A | 11/1992 | Wagner |
| 5,176,321 A | 1/1993 | Doherty |
| 5,203,159 A | 4/1993 | Koizumi et al. |
| 5,228,310 A | 7/1993 | Vandenberg |
| 5,291,960 A | 3/1994 | Brandenburg |
| 5,335,510 A | 8/1994 | Rockenfeller |
| 5,360,057 A | 11/1994 | Rockenfeller |
| 5,392,606 A | 2/1995 | Labinov et al. |
| 5,440,882 A | 8/1995 | Kalina |
| 5,444,972 A | 8/1995 | Moore |
| 5,488,828 A | 2/1996 | Brossard |
| 5,490,386 A | 2/1996 | Keller |
| 5,503,222 A | 4/1996 | Dunne |
| 5,531,073 A | 7/1996 | Bronicki |
| 5,538,564 A | 7/1996 | Kaschmitter |
| 5,542,203 A | 8/1996 | Luoma |
| 5,570,578 A | 11/1996 | Saujet |
| 5,588,298 A | 12/1996 | Kalina |
| 5,600,967 A | 2/1997 | Meckler |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,738,164 A | 4/1998 | Hildebrand |
| 5,754,613 A | 5/1998 | Hashiguchi |
| 5,771,700 A | 6/1998 | Cochran |
| 5,789,822 A | 8/1998 | Calistrat |
| 5,813,215 A | 9/1998 | Weisser |
| 5,833,876 A | 11/1998 | Schnur |
| 5,873,260 A | 2/1999 | Linhardt |
| 5,874,039 A | 2/1999 | Edelson |
| 5,894,836 A | 4/1999 | Wu |
| 5,899,067 A | 5/1999 | Hageman |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,973,050 A | 10/1999 | Johnson |
| 6,037,683 A | 3/2000 | Lulay |
| 6,041,604 A | 3/2000 | Nicodemus |
| 6,058,930 A | 5/2000 | Shingleton |
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,158,237 A | 12/2000 | Riffat |
| 6,164,655 A | 12/2000 | Bothien |
| 6,202,782 B1 * | 3/2001 | Hatanaka ............... 180/301 |
| 6,223,846 B1 * | 5/2001 | Schechter ............... 180/165 |
| 6,233,938 B1 | 5/2001 | Nicodemus |
| 6,282,900 B1 | 9/2001 | Bell |
| 6,282,917 B1 | 9/2001 | Mongan |
| 6,295,818 B1 | 10/2001 | Ansley |
| 6,299,690 B1 | 10/2001 | Mongeon |
| 6,341,781 B1 | 1/2002 | Matz |
| 6,374,630 B1 | 4/2002 | Jones |
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,539,720 B2 | 4/2003 | Rouse et al. |
| 6,539,728 B2 | 4/2003 | Korin |
| 6,571,548 B1 | 6/2003 | Bronicki |
| 6,598,397 B2 | 7/2003 | Hanna |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan et al. |
| 6,753,948 B2 | 6/2004 | Taniguchi |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |

(56) References Cited

U.S. PATENT DOCUMENTS

| | | |
|---|---|---|
| 6,857,268 B2 | 2/2005 | Stinger |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,533 B2 | 4/2006 | Lewis-Aburn et al. |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,469,542 B2 | 12/2008 | Kalina |
| 7,516,619 B2 | 4/2009 | Pelletier |
| 7,621,133 B2 | 11/2009 | Tomlinson |
| 7,654,354 B1 * | 2/2010 | Otterstrom ............ 180/165 |
| 7,665,291 B2 | 2/2010 | Anand |
| 7,665,304 B2 | 2/2010 | Sundel |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,972,529 B2 | 7/2011 | Machado |
| 8,096,128 B2 | 1/2012 | Held et al. |
| 8,099,198 B2 * | 1/2012 | Gurin ............ 700/288 |
| 8,146,360 B2 | 4/2012 | Myers |
| 8,281,593 B2 | 10/2012 | Held |
| 2001/0015061 A1 | 8/2001 | Viteri et al. |
| 2001/0030952 A1 | 10/2001 | Roy |
| 2002/0029558 A1 | 3/2002 | Tamaro |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2005/0056001 A1 | 3/2005 | Frutschi |
| 2005/0096676 A1 | 5/2005 | Gifford, III et al. |
| 2005/0109387 A1 | 5/2005 | Marshall |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0225459 A1 * | 10/2006 | Meyer ............ 62/512 |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie, II |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0135253 A1 | 6/2008 | Vinegar et al. |
| 2008/0173450 A1 | 7/2008 | Goldberg et al. |
| 2008/0211230 A1 | 9/2008 | Gurin |
| 2008/0250789 A1 | 10/2008 | Myers et al. |
| 2008/0252078 A1 | 10/2008 | Myers |
| 2009/0021251 A1 | 1/2009 | Simon |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 * | 6/2009 | Straubel ............ 180/65.1 |
| 2009/0173337 A1 | 7/2009 | Tamaura et al. |
| 2009/0173486 A1 | 7/2009 | Copeland |
| 2009/0180903 A1 | 7/2009 | Martin et al. |
| 2009/0205892 A1 * | 8/2009 | Jensen et al. ............ 180/165 |
| 2009/0211251 A1 | 8/2009 | Petersen et al. |
| 2009/0266075 A1 | 10/2009 | Westmeier et al. |
| 2009/0293503 A1 | 12/2009 | Vandor |
| 2010/0024421 A1 | 2/2010 | Litwin |
| 2010/0077792 A1 | 4/2010 | Gurin |

(56) References Cited

U.S. PATENT DOCUMENTS

| | | | |
|---|---|---|---|
| 2010/0083662 A1 | 4/2010 | Kalina | |
| 2010/0122533 A1 | 5/2010 | Kalina | |
| 2010/0146949 A1* | 6/2010 | Stobart et al. | 60/300 |
| 2010/0146973 A1 | 6/2010 | Kalina | |
| 2010/0156112 A1 | 6/2010 | Held et al. | |
| 2010/0162721 A1 | 7/2010 | Welch et al. | |
| 2010/0205962 A1 | 8/2010 | Kalina | |
| 2010/0218513 A1 | 9/2010 | Vaisman et al. | |
| 2010/0218930 A1 | 9/2010 | Proeschel | |
| 2010/0263380 A1 | 10/2010 | Biederman et al. | |
| 2010/0300093 A1 | 12/2010 | Doty | |
| 2010/0326076 A1 | 12/2010 | Ast et al. | |
| 2011/0030404 A1 | 2/2011 | Gurin | |
| 2011/0048012 A1 | 3/2011 | Ernst et al. | |
| 2011/0061384 A1 | 3/2011 | Held et al. | |
| 2011/0061387 A1 | 3/2011 | Held et al. | |
| 2011/0088399 A1 | 4/2011 | Briesch et al. | |
| 2011/0179799 A1 | 7/2011 | Allam et al. | |
| 2011/0185729 A1 | 8/2011 | Held | |
| 2011/0192163 A1 | 8/2011 | Kasuya | |
| 2012/0047892 A1 | 3/2012 | Held et al. | |
| 2012/0067055 A1 | 3/2012 | Held | |
| 2012/0128463 A1 | 5/2012 | Held | |
| 2012/0131918 A1 | 5/2012 | Held | |
| 2012/0131919 A1 | 5/2012 | Held | |
| 2012/0131920 A1 | 5/2012 | Held | |
| 2012/0131921 A1 | 5/2012 | Held | |
| 2012/0159922 A1 | 6/2012 | Gurin | |
| 2012/0159956 A1 | 6/2012 | Gurin | |
| 2012/0174558 A1 | 7/2012 | Gurin | |
| 2012/0186219 A1 | 7/2012 | Gurin | |
| 2012/0247134 A1 | 10/2012 | Gurin | |
| 2012/0247455 A1 | 10/2012 | Gurin et al. | |
| 2013/0033037 A1 | 2/2013 | Held et al. | |
| 2013/0036736 A1 | 2/2013 | Hart et al. | |
| 2013/0113221 A1 | 5/2013 | Held | |

FOREIGN PATENT DOCUMENTS

| | | |
|---|---|---|
| CN | 202055876 (U) | 11/2011 |
| CN | 202544943 U | 11/2012 |
| CN | 202544943 (U) | 11/2012 |
| CN | 202718721 U | 2/2013 |
| CN | 202718721 (U) | 2/2013 |
| DE | 199906087 (A1) | 8/2000 |
| DE | 10052993(A1) | 5/2002 |
| EP | 1977174 (A2) | 10/2008 |
| EP | 2419621 | 2/2012 |
| EP | 2446122 | 5/2012 |
| EP | 2478201 | 7/2012 |
| EP | 2500530 (A1) | 9/2012 |
| EP | 2550436 (A2) | 1/2013 |
| GB | 856985 (A) | 12/1960 |
| GB | 2075608 (A) | 11/1981 |
| JP | 58-193051 (A) | 11/1983 |
| JP | 61-152914 | 7/1986 |
| JP | 61-152914 (A) | 7/1986 |
| JP | 01-240705 | 9/1989 |
| JP | 01-240705 (A) | 9/1989 |
| JP | 05-321612 | 12/1993 |
| JP | H 05321612 (A) | 12/1993 |
| JP | 06-331225 (A) | 11/1994 |
| JP | 09-100702 (A) | 4/1997 |
| JP | 09-100702 (A2) | 4/1997 |
| JP | 2641581 (B2) | 5/1997 |
| JP | 09-209716 (A) | 8/1997 |
| JP | 2858750 (B2) | 12/1998 |
| JP | 2001-193419 (A) | 7/2001 |
| JP | 2001-193419 (A2) | 7/2001 |
| JP | 2002-097965 (A) | 4/2002 |
| JP | 2002-097965 (A2) | 4/2002 |
| JP | 2004-239250 (A) | 8/2004 |
| JP | 2004-239250 (A2) | 8/2004 |
| JP | 2004-332626 (A) | 11/2004 |
| JP | 2004-332626 (A2) | 11/2004 |
| JP | 2005-321612 (A) | 11/2005 |
| JP | 2005-533972 (A1) | 11/2005 |
| JP | 06-331225 | 7/2006 |
| JP | 2007-198200 | 8/2007 |
| JP | 2007-198200 (A) | 9/2007 |
| JP | 4343738 (B2) | 7/2009 |
| JP | 09-209716 A | 9/2009 |
| JP | 4343738 | 10/2009 |
| JP | 4343738 (B2) | 10/2009 |
| JP | 2011-017268 (A) | 1/2011 |
| KR | 100191080 | 6/1999 |
| KR | 100191080 (B1) | 6/1999 |
| KR | 10-2007-086244 | 8/2007 |
| KR | 10-2007 0086244 (A) | 8/2007 |
| KR | 10-0766101 (B1) | 10/2007 |
| KR | 0766101 (B1) | 10/2007 |
| KR | 10-0844634 | 7/2008 |
| KR | 10-0844634(A) | 7/2008 |
| KR | 10-0100067927 (A) | 6/2010 |
| KR | 1069914 (B1) | 6/2010 |
| KR | 1020110018769 (A) | 2/2011 |
| KR | 1069914 (B1) | 9/2011 |
| KR | 1103549 (B1) | 1/2012 |
| KR | 10-2012-0058582 (A) | 6/2012 |
| KR | 2012-0058582 | 6/2012 |
| KR | 2012-0068670 (A) | 6/2012 |
| KR | 2012-0128753 | 6/2012 |
| KR | 2012-0128753 (A) | 11/2012 |
| KR | 2012-0128755 (A) | 11/2012 |
| WO | WO 91/5145 (A1) | 4/1991 |
| WO | WO 96/09500 (A1) | 3/1996 |
| WO | WO 01/44658 (A1) | 6/2001 |
| WO | WO 2006/137957 (A1) | 12/2006 |
| WO | WO 2007/056241 (A2) | 5/2007 |
| WO | WO 2007/079245 (A2) | 7/2007 |
| WO | WO 2007/082103 (A2) | 7/2007 |
| WO | WO 2007/112090 (A2) | 10/2007 |
| WO | WO 2008/039725 (A2) | 4/2008 |
| WO | WO 2009/045196(A1) | 4/2009 |
| WO | WO 2009/058992 | 5/2009 |
| WO | WO 2010/074173 (A1) | 7/2010 |
| WO | WO 2010/121255 (A1) | 10/2010 |
| WO | WO 2010/126980 (A2) | 11/2010 |
| WO | WO 2010/151560 (A1) | 12/2010 |
| WO | WO 2011/017450 (A2) | 2/2011 |
| WO | WO 2011/017476 (A1) | 2/2011 |
| WO | WO 2011/017599 (A1) | 2/2011 |
| WO | WO 2011/034984 | 3/2011 |
| WO | WO 2011/062204 | 5/2011 |
| WO | WO 2011/094294 (A2) | 8/2011 |
| WO | WO 2011/119650 (A2) | 9/2011 |
| WO | WO 2012/074905 (A2) | 6/2012 |
| WO | WO 2012/074907 (A2) | 6/2012 |
| WO | WO 2012/074911 (A2) | 6/2012 |

(56) References Cited

FOREIGN PATENT DOCUMENTS

| | | |
|---|---|---|
| WO | WO 2012/074940 (A2) | 6/2012 |
| WO | WO 2013/059687 (A1) | 4/2013 |
| WO | WO 2013/059695 (A1) | 4/2013 |
| WO | WO 2013/055391 (A1) | 5/2013 |
| WO | WO 2013/070249 (A1) | 5/2013 |
| WO | WO 2013/074907 (A1) | 5/2013 |

OTHER PUBLICATIONS

Angelino, G., and Invernizzi, C.M., "Carbon Dioxide Power Cycles using Liquid Natural Gas as Heat Sink", Applied Thermal Engineering Mar. 3, 2009, 43 pages.

Bryant, John C., Saari, Henry, and Zanganeh, Kourosh, "An Analysis and Comparison of the Simple and Recompresion Supercritical CO2 Cycles" Supercritical CO2 Power Cycle Symposium, May 24-25, 2011, Boulder, CO, 8 pages.

Chapman, Daniel J., Arias, Diego A., "An Assessment of the Supercritical Carbon Dioxide Cycle for Use in a Solar Parabolic Trough Power Plant", Abengoa Solar, Apr. 29-30, 2009, Troy, NY, 20 pages.

Chapman, Daniel J., Arias, Diego A., "An Assessment of the Supercritical Carbon Dioxide Cycle for Use in a Solar Parabolic Trough Power Plant", Abengoa Solar, Apr. 29-30, 2009, Troy, NY, 5 pages.

Chen, Yang, Lundqvist, P., Jo Hansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.

Chen, Yang, "Thermodynamic Cycles Using Carbon Dioxide as Working Fluid", Doctoral Thesis, School of Industrial Engineering and Management, Stockholm, Oct. 2011, 150 pages, (3 parts).

Chordia, Lalit, "Optimizing Equipment for Supercritical Applications", Thar Energy LLC, Supercritical CO2 Power Cycle Symposium, May 24-25, 2011, Boulder, CO, 7 pages.

Combs, Osie V., "An Investigation of the Supercritical CO2 Cycle (Feher cycle) for Shipboard Application", Massachusetts Institute of Technology, May 1977, 290 pages.

Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.

Dostal, V., et al., A Supercritical Carbon Dioxide Cycle for Next Generation Nuclear Reactors, Mar. 10, 2004, 326 pages, (7 parts).

Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, 2009, Troy, NY, 8 pages.

Dostal, Vaclav, and Dostal, Jan, "Supercritical CO2 Regeneration Bypass Cycle—Comparison to Traditional Layouts", Supercritical CO 2 Power Cycle Symposium, May 24-25, 2011, Boulder, CO, 8 pages.

Eisemann, Kevin, and Fuller, Robert L, "Supercritical CO2 Brayton Cycle Design and System Start-up Options", Barber Nichols, Inc., Paper, Supercritical CO2 Power Cycle Symposium, May 24-25, 2011, Boulder, CO, 7 pages.

Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.

Feher, E.G, et al., "Investigation of Supercritical (Feher) Cycle", Astropower Laboratory, Missile & Space Systems Division, Oct. 1968, 152 pages.

Fuller, Robert L., and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.

Fuller, Robert L., and Eisemann, Kevin, "Centrifugal Compressor Off-Design Performance for Super-Critical CO2" Supercritical CO2 Power Cycle Symposium, May 24-25, 2011, Boulder, CO, 12 pages.

Gokhstein, D.P. and Verkhivicer, G.P. "Use of Carbon Dioxide as a Heat Carrier and Working Substance in Atomic Power Stations", Soviet Atomic Energy, Apr. 1969, vol. 26, Issue 4, pp. 430-432.

Gokhstein, D.P.; Taubman, E.I.; Konyaeva G.P., "Thermodynamic Cycles of Carbon Dioxide Plant with an Additional Turbine After the Regenerator", Energy Citations Database, Mar. 1973, 1 Page, Abstract only.

Hejzlar, P. et al, "Assessment of Gas Cooled Gas Reactor with Indirect Supercritical CO 2 Cycle" Massachusetts Institute of Technology, Jan. 2006, 10 pages.

Hoffman, John R, and Feher, E.G., "150 kwe Supercritical Closed Cycle System", Transactions of the ASME, Jan. 1971, pp. 70-80.

Jeong, Woo Seok, et al., "Performance of S-C0 2 Brayton Cycle with Additive Gases for SFR Application", Korea Advanced Institute of Science and Technology, Supercritical CO2 Power Cycle Symposium, May 24-25, 2011, Boulder, CO, 5 pages.

Johnson, Gregory A., & McDowell, Michael, "Issues Associated with Coupling Supercritical CO 2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.

Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).

Kulhanek, Martin, "Thermodynamic Analysis and Comparison of S-CO2 Cycles" Czech Technical University in Prague, Supercritical CO2 Power Cycle Symposium, May 24-25, 2011, Boulder, CO, 14 pages.

Kulhanek, Martin, "Thermodynamic Analysis and Comparison of S-CO2 Cycles", Czech Technical University in Prague, Supercritical CO2 Power Cycle Symposium, May 24-25, 2011, Boulder, CO, 7 pages.

Kulhanek, Martin, and Dostal, Vaclav, "Supercritical Carbon Dioxide Cycles Thermodynamic Analysis and Comparison", Abstract, Faculty Conference held in Prague, Mar. 24, 2009, 13 pages.

Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.

Mo Isseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.

Munoz de Escalona, Jose M., "The Potential of the Supercritical Carbon Dioxide Cycle in High Temperature Fuel Cell Hybrid Systems", Thermal Power Group, University of Seville, Supercritical CO2 Power Cycle Symposium, May 24-25, 2011, Boulder, CO, 6 pages.

Munoz de Escalona, Jose M., et al., "The Potential of the Supercritical Carbon Dioxide Cycle in High Temperature Fuel Cell Hybrid Systems", Thermal Power Group, University of Seville, Supercritical CO2 Power Cycle Symposium, May 24-25, 2011, Boulder, CO, 19 pages.

Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.

Muto, Yasushi, and Kato, Yasuyoshi, "Optimal Cycle Scheme of Direct Cycle Supercritical CO2 Gas Turbine for Nuclear Power Generation Systems", International Conference on Power Engineering-2007, Oct. 23-27, 2007, Hangzhou, China, pp. 86-87.

Noriega, Bahamonde J.S., "Design Method for s-CO2 Gas Turbine Power Plants", Master of Science Thesis, Delft University of Technology, Oct. 2012, 122 pages, (3 parts).

(56) References Cited

OTHER PUBLICATIONS

Oh, Chang, et al., "Development of a Supercritical Carbon Dioxide Brayton Cycle: Improving PBR Efficiency and Testing Material Compatibility" Nuclear Energy Research Initiative Report, Oct. 2004, 38 pages.

Oh, Chang; et al., "Development of a Supercritical Carbon Dioxide Brayton Cycle: Improving VHTR Efficiency and Testing Material Compatibility" Nuclear Energy Research Initiative Report, Final Report Mar. 2006, 97 pages.

Parma, Ed, et al., "Supercritical CO2 Direct Cycle Gas Fast Reactor (SC-GFR) Concept" Presentation for Supercritical CO2 Power Cycle Symposium, May 24-25, 2011, Boulder, CO, 40 pages.

Parma, Ed., et al, "Supercritical CO2 Direct Cycle Gas Fast Reactor (SC-GFR) Concept", Supercritical CO2 Power Cycle Symposium, May 24-25, 2011, Boulder, CO, 9 pages.

Parma, Edward J., et al., "Supercritical CO2 Direct Cycle Gas Fast Reactor (SC-GFR) Concept" Sandia National Laboratories, May 2011, 55 pages.

PCT/US2006/049623 (EPS-02 OPCT)—Written Opinion of ISA dated Jan. 4, 2008, 4 pages.

PCT/US2007/001120 (EPS-019PCT)—International Search Report dated Apr. 25, 2008, 5 pages.

PCT/US2007/079318 (EPS-021PCT)—International Preliminary Report on Patentability dated Jul. 7, 2008, 5 pages.

PCT/US2010/031614 (EPS-014)—International Search Report dated Jul. 12, 2010, 24 pages.

PCT/US2010/031614—(EPS-14)—International Preliminary Report on Patentability dated Oct. 27, 2011.

PCT/US2010/039559 (EPS-015)—International Preliminary Report on Patentability dated Jan. 12, 2012, 7 pages.

PCT/US2010/044476(EPS-018)—WO Publication and International Search Report dated Sep. 29, 2010, 52 pages.

PCT/US2010/044681 (EPS016)—International Search Report and Written Opinion mailed Oct. 7, 2010.

PCT/US2010/044681 (EPS-016)—International Preliminary Report on Patentability dated Feb. 16, 2012, 9 pages.

PCT/US2010/049042 (EPS-008)—International Search Report and Written Opinion dated Nov. 17, 2010.

PCT/US2010/049042 (EPS-008)—International Preliminary Report on Patentability dated Mar. 29, 2012.

PCT/US2011/029486 (EPS-002)—International Preliminary Report on Patentability dated Sep. 25, 2012.

PCT/US2011/029486 (EPS-002)—International Search Report and Written Opinion dated Nov. 16, 2011.

PCT/US2011/062266 (EPS-069)—International Search Report and Written Opinion dated Jul. 9, 2012.

PCT/US2011/062198 (EPS-070)—International Search Report and Written Opinion dated Jul. 2, 2012.

PCT/US2011/062201 (EPS-071)—International Search Report and Written Opinion dated Jun. 26, 2012.

PCT/US2011/062204 (EPS-072)—International Search Report dated Nov. 1, 2012, 10 pages.

PCT/US2011/62207 (EPS-073)—International Search Report and Written Opinion dated Jun. 28, 2012.

PCT/US2012/000470 (EPS-124)—International Search Report dated Mar. 8, 2013, 10 pages.

PCT/US2012/061151 (EPS-125)—International Search Report and Written Opinion dated Feb. 25, 2013, 9 pages.

PCT/US2012/061159 (EPS-126)—WO Publication and International Search Report dated Mar. 2, 2013, 22 pages.

Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.

Saari, Henry, et al., "Supercritical CO2 Advanced Brayton Cycle Design", Carleton University, Supercritical CO2 Power Cycle Symposium, May 24-25, 2011, Boulder, CO, 21 pages.

San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.

Sarkar, J., and Bhattacharyya, Souvik, "Optimization of Recompression S-CO2 Power Cycle with Reheating" Energy Conversion and Management 50 (May 17, 2009), pp. 1939-1945.

Tom, Samsun Kwok Sun, "The Feasibility of Using Supercritical Carbon Dioxide as a Coolant for the Candu Reactor", The University of British Columbia Jan. 1978, 156 pages.

VGB PowerTech Service GmbH, "CO2 Capture and Storage", A VGB Report on the State of the Art, Aug. 25, 2004, 112 pages.

Vidhi, Rachana, et al., "Study of Supercritical Carbon Dioxide Power Cycle for Power Conversion from Low Grade Heat Sources", University of South Florida and Oak Ridge National Laboratory, Supercritical CO2 Power Cycle Symposium, May 24-25, 2011, Boulder, CO, 17 pages.

Vidhi, Rachana, et al., "Study of Supercritical Carbon Dioxide Power Cycle for Power Conversion from Low Grade Heat Sources", University of South Florida and Oak Ridge National Laboratory, Supercritical CO2 Power Cycle Symposium, May 24-25, 2011, Boulder, CO, 8 pages.

Wright, Steven A., et al., "Modeling and Experimental Results for Condensing Supercritical CO2 Power Cycles", Sandia Report, Jan. 2011, 47 pages.

Wright, Steven A., et al., "Supercritical CO2 Power Cycle Development Summary at Sandia National Laboratories", May 24-25, 2011, (1 page, Abstract only).

Wright, Steven, "Mighty Mite", Mechanical Engineering, Jan. 2012, pp. 41-43.

Yoon, Ho Joon, et al., "Preliminary Results of Optimal Pressure Ratio for Supercritical CO2 Brayton Cycle coupled with Small Modular Water Cooled Reactor" Korea Advanced Institute of Science and Technology and Khalifa University of Science, Technology and Research, Boulder, CO, May 25, 2011, 18 Pages.

Yoon, Ho Joon, et al., "Preliminary Results of Optimal Pressure Ratio for Supercritical CO2 Brayton Cycle coupled with Small Modular Water Cooled Reactor", Korea Advanced Institute of Science and Technology and Khalifa University of Science, Technology and Research, May 24-25, 2011, Boulder, CO, 7 pages.

Dostal, Vaclav and Kulhanek, Martin, "Research on the Supercritical Carbon Dioxide Cycles in the Czech Republic", Czech Technical University in Prague, Symposium on SC02 Power Cycles, Apr. 29-30, 2009, Troy, NY, 8 pages.

Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.

Hoffman, John R., and Feher, E.G., "150 kwe Supercritical Closed Cycle System", Transactions of the ASME, Jan. 1971, pp. 70-80.

PCT/US2007/001120—International Search Report dated Apr. 25, 2008, 7 pages.

PCT/US2010/031614—International Search Report dated Jul. 12, 2010, 3 pages.

PCT/US2010/031614—International Preliminary Report on Patentability dated Oct. 27, 2011, 9 pages.

PCT/US2010/039559—International Preliminary Report on Patentability dated Jan. 12, 2012, 7 pages.

PCT/US2010/039559—Notification of Transmittal of the International.Search Report and Written Opinion of the International Searching Authority, or the Declaration dated Sep. 1, 2010, 6 pages.

PCT/US2010/044476—International Search Report dated Sep. 29, 2010, 23 pages.

PCT/US2010/049042—International Search Report and Written Opinion dated Nov. 17, 2010, 11 pages.

PCT/US2011/029486—International Preliminary Report on Patentability dated Sep. 25, 2012, 6 pages.

PCT/US2011/029486—International Search Report and Written Opinion dated Nov. 16, 2011, 9 pages.

PCT/US2012/061159—International Search Report dated Mar. 2, 2013, 10 pages.

* cited by examiner

HYBRID POWER SYSTEMS

CROSS-REFERENCE TO RELATED APPLICATIONS

This application claims benefit of U.S. Provisional Patent Application No. 61/209,760, entitled "Hybrid Power Systems," filed Mar. 11, 2009, is hereby incorporated by reference herein in its entirety.

FIELD OF THE INVENTION

The present invention generally relates to hybrid power systems for vehicles. In one embodiment, the present invention relates to hybrid power systems for various types of transportation vehicles where the hybrid power systems is partially, or even totally, based on the use of at least one hydraulic system to provide supplemental, or even the primary, motion power for a hybrid vehicle. In another embodiment, the hybrid power systems of the present invention are capable of providing both motion power as well as cabin comfort heating and/or cooling. In still another embodiment, a hybrid vehicle according to the present invention comprises a power generating system and passenger cabin comfort system, wherein the power generating system comprises a thermodynamic working fluid (FA) in a first thermodynamic cycle (C1), a pump (P1), a motor (M1), a high pressure accumulator, a low pressure reservoir, and at least one heat exchanger, wherein the thermodynamic working fluid (FA) is concurrently operable to create either vehicle motion through the motor (M1) or electricity through a generator and is operable to create passenger cabin cooling or heating through the expansion or contraction of the thermodynamic working fluid (FA).

BACKGROUND OF THE INVENTION

Due to a variety of factors including, but not limited to, global warming issues, fuel economy issues, crude oil price and availability issues, hybrid vehicles are becoming more popular today. Various hybrid vehicles are currently on the market today and most rely upon the use of a gasoline, or other fossil fuel, engine that is supplemented in some manner by an electric motor that is driven by battery power. As is well known in the art, the batteries that are used to power hybrid vehicles are both costly and heavy due to the number needed to yield a noticeable increase in vehicle fuel economy. Given this, various other hybrid or alternative power sources are being investigated as methods by which to power transportation vehicles (e.g., cars, trucks, semis, boats, personal water craft, planes, etc). To date, all such hybrid, or alternative fuel, power systems have various drawbacks including, but not limited to, high cost, availability of fueling stations (e.g., hydrogen fueling stations for fuel cell vehicles only currently exist in a few select areas), technical disadvantages (e.g., hybrid systems can be inefficient because of the power drain produced by having to heat and/or cool a passenger compartment), etc. Additionally, a hybrid power system for a transportation vehicle that is able to "do away" with the mechanical transmission necessary in gas/electric hybrids would be able to capture significant fuel savings.

Given the above, there is a need in the art for improved hybrid power systems that are designed to not only power a vehicle for the purposes of motion, but that can also serve to heat or cool a passenger cabin in a more efficient manner.

SUMMARY OF THE INVENTION

The present invention generally relates to hybrid power systems for vehicles. In one embodiment, the present invention relates to hybrid power systems for various types of transportation vehicles where the hybrid power systems is partially, or even totally, based on the use of at least one hydraulic system to provide supplemental, or even the primary, motion power for a hybrid vehicle. In another embodiment, the hybrid power systems of the present invention are capable of providing both motion power as well as cabin comfort heating and/or cooling. In still another embodiment, a hybrid vehicle according to the present invention comprises a power generating system and passenger cabin comfort system, wherein the power generating system comprises a thermodynamic working fluid (FA) in a first thermodynamic cycle (C1), a pump (P1), a motor (M1), a high pressure accumulator, a low pressure reservoir, and at least one heat exchanger, wherein the thermodynamic working fluid (FA) is concurrently operable to create either vehicle motion through the motor (M1) or electricity through a generator and is operable to create passenger cabin cooling or heating through the expansion or contraction of the thermodynamic working fluid (FA).

In one embodiment, the present invention relates to a hybrid vehicle comprising: a power generating system; and a passenger cabin comfort system, the system comprising: a thermodynamic working fluid (FA) in a first thermodynamic cycle (C1); a pump (P1); a motor (M1); a high pressure accumulator; a low pressure reservoir; and at least one heat exchanger, wherein the thermodynamic working fluid (FA) is concurrently operable to create either vehicle motion through the motor (M1) or electricity through a generator and is operable to create passenger cabin cooling or heating through expanding the thermodynamic working fluid (FA).

In another embodiment, the present invention relates to a hybrid power generating system comprising: a thermodynamic working fluid (FA) in a first thermodynamic cycle (C1); a pump (P1); a motor (M1); a high pressure accumulator; a low pressure reservoir; a first thermodynamic cycle mass regulator operable to control the total mass within the first thermodynamic cycle (C1); a control system and at least one valve to control the mass flow into and out of the high pressure accumulator; at least one heat exchanger; and a heat pump system in a second thermodynamic cycle (C2), wherein the thermodynamic working fluid (FA) is concurrently operable to create vehicle motion through the motor (M1) and to create passenger cabin cooling or heating through the expansion and/or contraction of the thermodynamic working fluid (FA).

In still another embodiment, the present invention relates to a hybrid power generation system comprising: a first thermodynamic cycle (C1) comprising: a thermodynamic working fluid (F1); a high pressure stage (HP1); a low pressure stage (LP1); and a phase change temperature (PC1) at the high pressure stage (HP1); a second thermodynamic cycle (C2) comprising: a thermodynamic working fluid (F2); a high pressure stage (HP2); a low pressure stage (LP2); and a phase change temperature (PC2) at the low pressure stage (LP2), wherein the thermodynamic working fluid (F1) is different from the thermodynamic working fluid (F2), and wherein the phase change temperature (PC1) is lower than the phase change temperature (PC2) by at least 2 degrees Kelvin.

In still another embodiment, the present invention relates to a hybrid vehicle having a power generating system and a passenger shock absorber system comprising: a thermodynamic working fluid (FA) in a first thermodynamic cycle (C1); a pump (P1); a motor (M1); a high pressure accumulator; a low pressure reservoir; and at least one heat exchanger, wherein the thermodynamic working fluid (FA) is concurrently operable to create either vehicle motion through the motor (M1) or electricity through a generator and is operable as the passenger shock absorber system compressing the thermodynamic working fluid (FA).

In still another embodiment, the present invention relates to a hybrid power system as shown and described herein.

In still another embodiment, the present invention relates to a hybrid vehicle comprising at least one of the hybrid power systems shown and described herein.

DETAILED DESCRIPTION OF THE INVENTION

Figure 1:
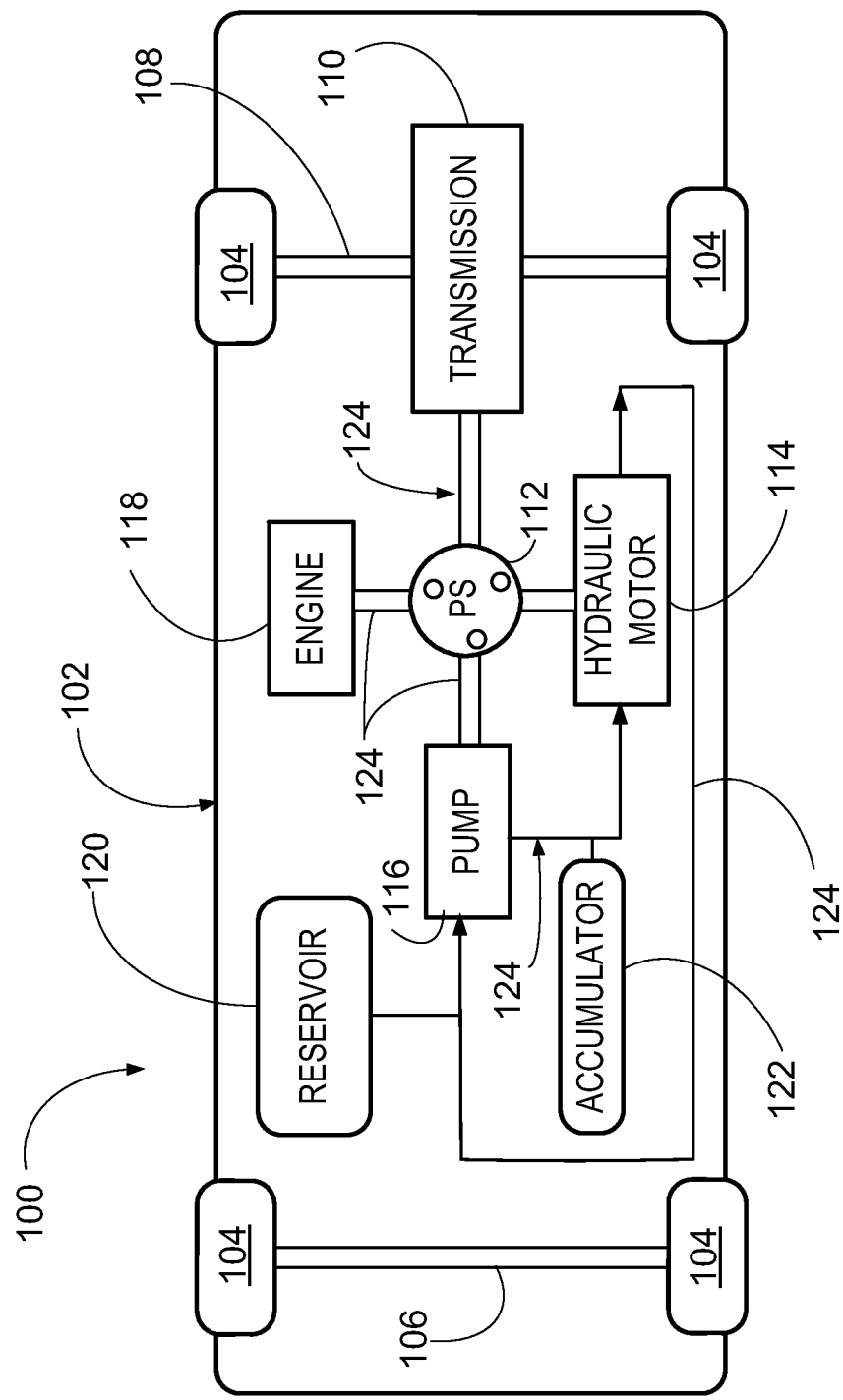
FIG. 1 is a parallel-series hybrid power system in accordance with the one embodiment of present invention.

The present invention generally relates to hybrid power systems for vehicles. In one embodiment, the present invention relates to hybrid power systems for various types of transportation vehicles where the hybrid power systems is partially, or even totally, based on the use of at least one hydraulic system to provide supplemental, or even the primary, motion power for a hybrid vehicle. In another embodiment, the hybrid power systems of the present invention are capable of providing both motion power as well as cabin comfort heating and/or cooling. In still another embodiment, a hybrid vehicle according to the present invention comprises a power generating system and passenger cabin comfort system, wherein the power generating system comprises a thermodynamic working fluid (FA) in a first thermodynamic cycle (C1), a pump (P1), a motor (M1), a high pressure accumulator, a low pressure reservoir, and at least one heat exchanger, wherein the thermodynamic working fluid (FA) is concurrently operable to create either vehicle motion through the motor (M1) or electricity through a generator and is operable to create passenger cabin cooling or heating through the expansion and/or contraction of the thermodynamic working fluid (FA).

As used throughout the specification and claims, the term "pump" includes standard pumps as known to those of skill in the art, as well as any device, or devices that can function as a compressor. Also, as used throughout the specification and claims, the term "expander" includes standard expanders as known to those of skill in the art, as well as any device, or devices that can function as an "expander" and a "compressor." Further, in FIGS. 4, 5, 6, and 7, the term "hydraulic motor" is intended to include those standard hydraulic motors as known to those of skill in the art as well as any device that can alternatively function as a compressor and an expander. Further, in FIG. 2, the engine may be coupled to a pump/compressor as shown in FIG. 6.

In one embodiment, the present invention relates to a hybrid vehicle having a power generating system and passenger cabin comfort system comprising a thermodynamic working fluid (FA) in a first thermodynamic cycle (C1), a pump (P1), a motor (M1), a high pressure accumulator, a low pressure reservoir, and at least one heat exchanger, wherein the thermodynamic working fluid (FA) is concurrently operable to create either vehicle motion through the motor (M1) or electricity through a generator and is operable to create passenger cabin cooling or heating through expanding the thermodynamic working fluid (FA). In this embodiment, as well as all of the other embodiments of the present invention, the thermodynamic working fluid (FA) can be selected from any suitable thermodynamic working fluid (FA) including, but not limited to, carbon dioxide, nitrogen, helium, air, etc. In one embodiment, the thermodynamic working fluid (FA) is selected from an inert gas such as air, nitrogen or carbon dioxide.

In one embodiment, a hybrid vehicle according to present invention has a thermodynamic working fluid (FA) that is carbon dioxide, and the thermodynamic working fluid (FA) is cycled between the first thermodynamic cycle (C1) having a high pressure stage (HP1) and a low pressure stage (LP1). In one embodiment, the high pressure stage (HP1) has a pressure in the range of about 750 to about 12,000 psi, or from about 750 to about 6,000 psi, or even from about 1,000 to about 3,000 psi. In one embodiment, the low pressure stage (LP1) has a pressure in the range of about 50 to about 1,000 psi, or from about 400 to about 1,000 psi, or even from about 300 to about 750 psi. Here, as well as elsewhere in the specification and claims, individual numerical range values and/or limits can be combined to form new, or non-disclosed, ranges.

In another embodiment, a hybrid vehicle according to the present invention contains therein a power system that utilizes a thermodynamic working fluid (FA) that remains at a pressure greater than the supercritical pressure of such a thermodynamic working fluid (FA) throughout the entire first thermodynamic cycle (C1) when passing through at least one pump (P1) and at least one motor (M1). As is known to those of skill in the art, depending upon the nature of the thermodynamic working fluid (FA), the supercritical pressure will vary. Given this, the power systems of the present invention can be designed to accommodate various different thermodynamic working fluids (FA).

In another embodiment, a hybrid vehicle according an embodiment of the present invention has a thermodynamic working fluid (FA) that is a transcritical working fluid. Additionally, a hybrid vehicle in accordance with the present invention can further comprise a second thermodynamic cycle (C2), wherein the second cycle utilizes the same thermodynamic working fluid (FA) as the first thermodynamic cycle (C1), and wherein the second thermodynamic cycle (C2) comprises a hydraulic pump (P2) and a hydraulic motor (M2).

In another embodiment, a hybrid vehicle according to the present invention utilizes a second thermodynamic cycle (C2) having a high pressure stage (HP2) and a lower pressure stage (LP2), and wherein both (HP2) and (LP2) remain at pressures greater than the thermodynamic working fluid's (FA) supercritical pressure. In one embodiment, the high pressure stage (HP2) has a pressure in the range of about 1,500 to about 12,000 psi, or from about 2,500 to about 6,000 psi, or even from about 3,000 to about 6,000 psi. In one embodiment, the low pressure stage (LP2) has a pressure in the range of about 1,100 to about 3,000 psi, or from about 1,100 to about 2,500 psi, or even from about 1,500 to about 2,000 psi. Here, as well as elsewhere in the specification and claims, individual numerical range values and/or limits can be combined to form new, or non-disclosed, ranges.

In one embodiment, a hybrid vehicle according to the present invention can further comprise a housing enclosure, wherein the motor (M1) and the hydraulic pump (P2) are hermetically sealed in the same housing enclosure. In some embodiments, the hybrid vehicles of the present invention utilize a thermodynamic working fluid (FA) that is a transcritical working fluid.

In one embodiment, a hybrid vehicle according to the present invention can further comprise at least two hydraulic motors (WM1 and WM2) and at least two wheels, wherein the at least two hydraulic motors (WM1 and WM2) drive the hybrid vehicle's at least two wheels. Additionally, in this embodiment, the at least two hydraulic motors (WM1 and WM2) can be magnetically coupled to the at least two wheels.

In another embodiment, a hybrid power generating system in accordance with the present invention comprises a thermodynamic working fluid (FA) in a first thermodynamic cycle (C1); a pump (P1); a motor (M1); a high pressure accumulator; a low pressure reservoir; a first thermodynamic cycle mass regulator operable to control the total mass within the first thermodynamic cycle (C1); a control system and at least one valve to control the mass flow into and out of the high pressure accumulator; at least one heat exchanger; and a heat pump system in a second thermodynamic cycle (C2), wherein the thermodynamic working fluid (FA) is concurrently operable to create vehicle motion through the motor (M1) and to create passenger cabin cooling or heating through the expansion and/or contraction of the thermodynamic working fluid (FA).

In still another embodiment, a hybrid power generating system according to the present invention has at least one valve to regulate mass flow in the second thermodynamic cycle (C2), and wherein the second thermodynamic cycle (C2) is capable of operating independent of the first thermodynamic cycle (C1) by drawing the thermodynamic working fluid (FA) from the high pressure accumulator. In one instance, in the above hybrid power generating system, the first thermodynamic cycle (C1) has a high pressure stage at pressure (HP1), the second thermodynamic cycle (C2) has a high pressure stage at pressure (HP2), and the high pressure stage at pressure (HP2) is lower than the high pressure stage at pressure (HP1). In another instance, in the above hybrid power generating system, the first thermodynamic cycle (C1) has a low pressure stage at pressure (LP1), the second thermodynamic cycle (C2) has a high pressure stage at pressure (HP2), and the low pressure stage at pressure (LP1) is higher than the high pressure stage at pressure (HP2).

In yet another embodiment, a hybrid power generation system according to the present invention has a second thermodynamic cycle (C2) that further comprises a waste heat recovery system from a combustion engine; an expansion device (E2); a waste heat recovery system bypass valve; a condenser and an expansion device, wherein the condenser is upstream of the expansion device and downstream of the waste heat recovery system bypass valve. In one instance, this embodiment also comprises a waste heat recovery external heating valve (VE); a waste heat recovery internal heating valve (VI), wherein the waste heat recovery external heating valve (VE) is upstream of the waste heat recovery internal heating valve (VI), wherein the waste heat recovery external heating valve is operable to heat a heat transfer fluid (FB).

In one instance, a hybrid power generation system according to the present invention has, at an ambient temperature (OT), a first thermodynamic cycle (C1) having a condensing temperature (CT1), wherein the first thermodynamic cycle (C1) has a peak high pressure temperature (PK1), and wherein the total mass (TM1) within the first thermodynamic cycle (C1) is a dynamic function of at least one temperature selected from the ambient temperature (OT), the condensing temperature (CT1), or the peak high pressure temperature (PK1). In one embodiment, the ambient temperature (OT) is in the range of about −40° C. to about 60° C., or from about −30° C. to about 50° C., or even from about −20° C. to about 40° C. Here, as well as elsewhere in the specification and claims, individual numerical range values and/or limits can be combined to form new, or non-disclosed, ranges.

In another instance, a hybrid power generation system according to the present invention has, at an ambient temperature (OT), a thermodynamic cycle (C1) having a condensing temperature (CT1), wherein the first thermodynamic cycle (C1) has a peak high pressure temperature (PK1), and wherein the peak high pressure temperature (PK1) is a dynamic function of at least one temperature selected from the ambient temperature (OT) or the condensing temperature (CT1). In one embodiment, the ambient temperature (OT) is in the ranges discussed above, while the condensing temperature (CT1) is in the range of about −10° C. to about 60° C., or from about 0° C. to about 50° C., or even from about 10° C. to about 30° C. Here, as well as elsewhere in the specification and claims, individual numerical range values and/or limits can be combined to form new, or non-disclosed, ranges.

In yet another embodiment, a hybrid power generation system according to the present invention has a pressure ratio (PR1) between the low pressure stage (LP1) and the high pressure stage (HP1) of (HP1) divided by (LP1), wherein the peak high pressure temperature (PK1) is a dynamic function of the pressure ratio (PR1). Here the pressure ranges for (LP1) and (HP1) are within the ranges discussed above.

In yet another embodiment, a hybrid power generation system according to the present invention comprises a first thermodynamic cycle (C1) comprising a thermodynamic working fluid (F1); a high pressure stage (HP1); a low pressure stage (LP1); and a phase change temperature (PC1) at the high pressure stage (HP1); a second thermodynamic cycle (C2) comprising a thermodynamic working fluid (F2); a high pressure stage (HP2); a low pressure stage (LP2); and a phase change temperature (PC2) at the low pressure stage (LP2), wherein the thermodynamic working fluid (F1) is different from the thermodynamic working fluid (F2), and wherein the phase change temperature (PC1) is lower than the phase change temperature (PC2) by at least 2 degrees Kelvin. Here the pressure ranges for (LP1), (LP2), (HP1) and (HP1) are within the ranges discussed above.

In one instance, a hybrid power generation system according to the above embodiment utilizes a second thermodynamic cycle (C2) that is an absorption heat pump cycle comprising an absorbent (AB2), and an absorber, wherein the thermodynamic working fluid (F2) is the absorbate of the absorption heat pump, wherein the first thermodynamic cycle (C1) is in fluid communication with the second thermodynamic cycle (C2) absorber, wherein the absorber produces heat of absorption when the thermodynamic working fluid (F2) is mixed with the absorbent (AB2), and wherein the heat of absorption is transferred from the second thermodynamic cycle (C2) to the first thermodynamic cycle (C1).

In another instance, a hybrid power generation system according to the present invention utilizes a heat of absorption at a temperature (AT2), wherein the temperature (AT2) is greater than the phase change temperature (PC1) by at least 2 degrees Kelvin, having a first thermodynamic working fluid (F1) within a thermodynamic cycle having a high pressure (HP1), has an expander inlet temperature (EIT1), and has a low pressure (LP1); and a second thermodynamic working fluid (F2) within a second thermodynamic cycle in thermal communication with the first thermodynamic cycle having a high pressure (HP2), a pump discharge temperature (PDT2), an expander inlet temperature (EIT2). In yet another instance, a hybrid power generation system according to the present invention utilizes the heat of vaporization from the phase change of the thermodynamic working fluid (F2) from vapor to liquid (or from supercritical fluid to liquid) to change the phase of the thermodynamic working fluid (F1) from a liquid to vapor (or from liquid to supercritical fluid), wherein the temperature (AT2) is greater than the phase change temperature (PC1) by at least 2 degrees Kelvin. The pressures for (LP1), (LP2), (HP1), and (HP2) are dynamically determined to ensure the phase change of both thermodynamic cycles overlap as a function of temperature. In one embodiment, the temperature for (AT2) is in the range of about 90° C. to about 160° C., or from about 110° C. to about 150° C., or even from about 120° C. to about 140° C. Here, as well as elsewhere in the specification and claims, individual numerical range values and/or limits can be combined to form new, or non-disclosed, ranges.

In still yet another embodiment, the present invention relates to a hybrid vehicle having a power generating system and a passenger shock absorber system comprising a thermodynamic working fluid (FA) in a first thermodynamic cycle (C1); a pump (P1); a motor (M1); a high pressure accumulator; a low pressure reservoir; and at least one heat exchanger, wherein the thermodynamic working fluid (FA) is concurrently operable to create either vehicle motion through the motor (M1) or electricity through a generator and is operable as the passenger shock absorber system compressing the thermodynamic working fluid (FA).

Exemplary embodiments of the present invention will not be discussed with reference to the attached Figures. Such embodiments are merely exemplary in nature and not to be construed as limiting the scope of the present invention in any manner. With regard to FIGS. 1 through 6, like reference numerals refer to like parts.

FIG. 1 depicts a parallel-series hybrid configuration of a hybrid power system 100 in a vehicle 102 having wheels 104 and front and rear axles 106 and 108, respectively. As would be apparent to those of skill in the art, the hybrid power system 100 can be applied to any type of vehicle including, but not limited to, cars, trucks, semis, boats, personal water craft, and planes. In the embodiment of FIG. 1, axle 108 has a transmission 110 that is operatively coupled to a parallel-series controller 112. Controller 112 is also operatively coupled to a hydraulic motor 114, a pump 116 and an engine 118. Engine 118 can be a fossil fuel-based engine, an alternative fuel-based engine, an electrical motor/engine, or any other type of engine so long as engine 118 can supply power to controller 112. Turning to hydraulic motor 114 and pump 116, these portions of hybrid power system 100 are in fluid connection with reservoir 120 and accumulator 122 via a suitable array of hydraulic piping 124. Given this, the hydraulic portion of hybrid power system 100 contains therein a suitable working fluid, or even a suitable thermodynamic working fluid. Such fluids include, but are not limited to, typical hydraulic fluids (e.g., hydraulic oils), or even inert gases that are contained within the system under pressure so as to place them in a fluidic state, or supercritical state. Such inert gases include, but are not limited to, those discussed above. Based upon the actions of controller 112, vehicle 102 is powered by either one or both of hydraulic motor 114 and engine 118 via power routed through transmission 110.

Figure 2:
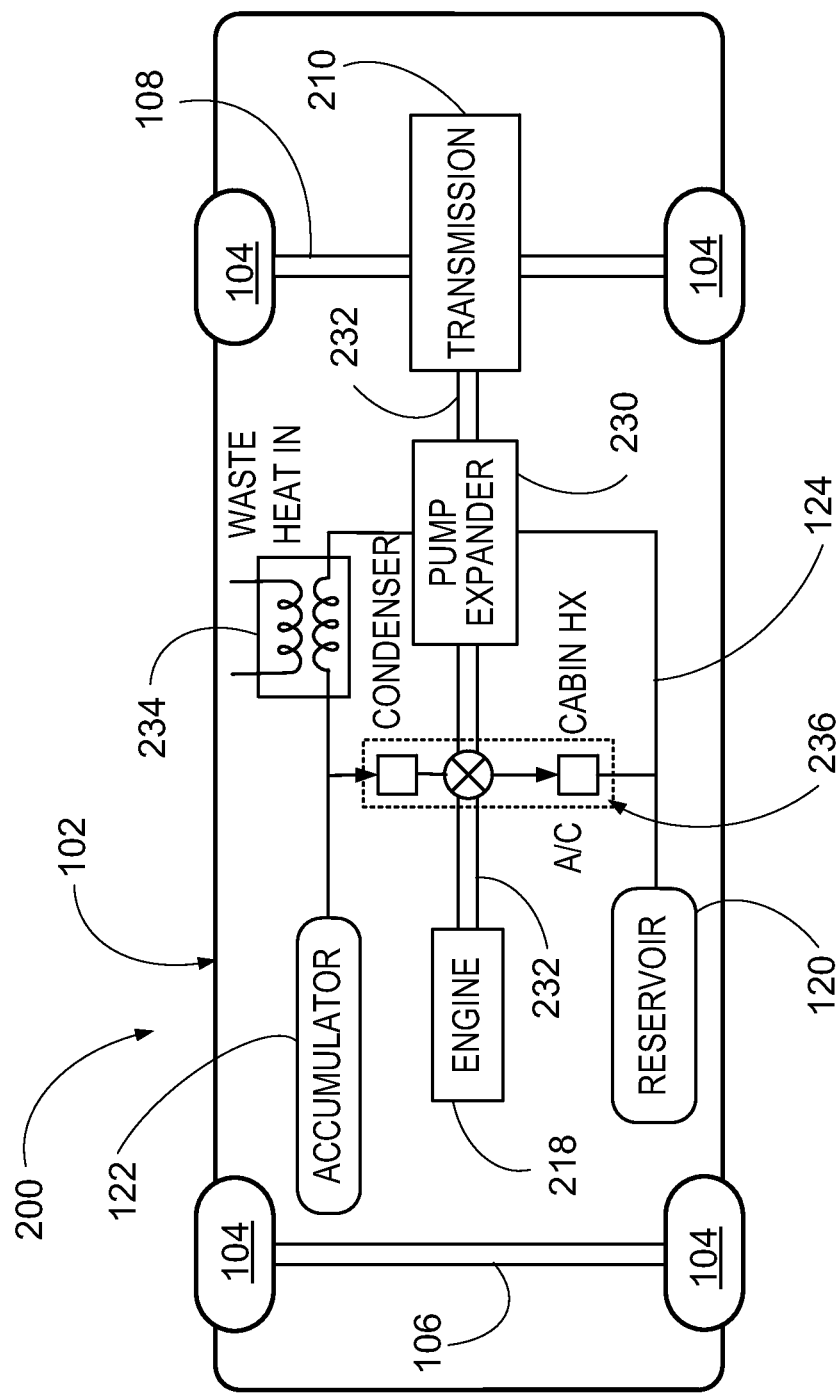
FIG. 2 is a parallel hybrid power system in accordance with one embodiment of the present invention.

Turning to FIG. 2, system 200 of FIG. 2 is similar in many respects to system 100 of FIG. 1 except that controller 112 and hydraulic motor 114 have been replaced by a combination of an engine 218 and a pump/expander 230. As can be seen from FIG. 2, engine 218 and a pump/expander 230 are operatively connected to one another and to transmission 210 via a fluidic and/or hydraulic drive line 232. Additionally, the embodiment of Figure contains hydraulic piping 124 that is connected to pump/expander 230, accumulator 122, reservoir 120, heat capture device 234, and the cabin heating and cooling unit 236. Given this, the system 200 of this embodiment is not only able to provide power to transmission 210 to move vehicle 102, but provide power, heat and/or heat removal to cabin heating and cooling unit 236. Heat capture device 234 is designed to both capture external usable heat and to dissipate excess internal heat generated by system 200 depending upon the circumstances encountered.

Figure 3:
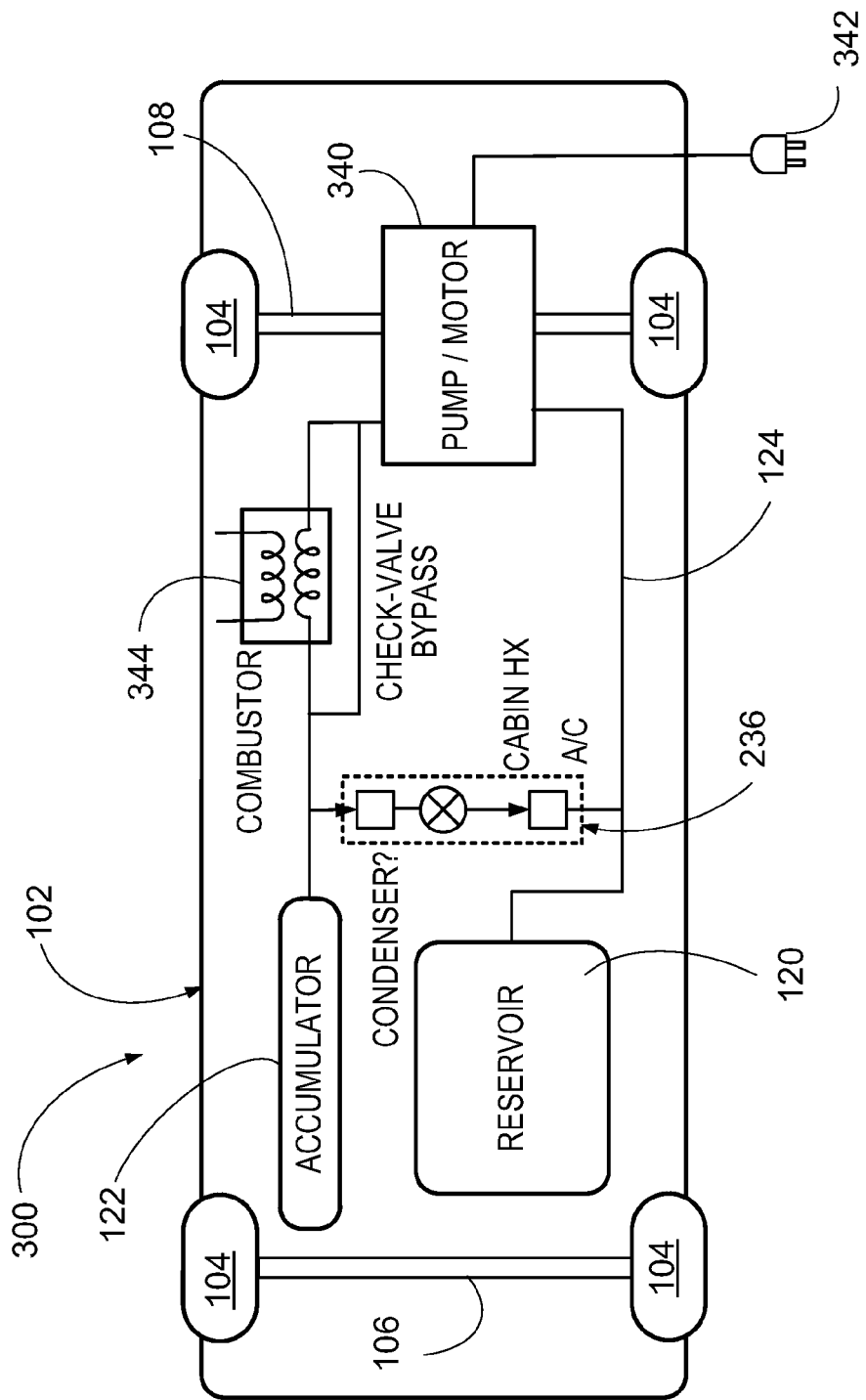
FIG. 3 is a hydraulic hybrid power system in accordance with one embodiment of the present invention.

Turning to FIG. 3, system 300 of FIG. 3 is similar in many respects to system 200 of FIG. 2 except that transmission 210 has been replaced by a pump/motor 340 that can be plugged in via plug 342 and recharged via, for example, a battery pack or some other suitable electrical charge storing device (not shown). Additionally, heat capture device 234 has been replaced by a combustor 344 that is designed to generate, when needed, extra heat to feed into the fluidic portion of system 300. As can be seen from FIG. 3, piping 124, that contains therein a suitable working fluid or a thermodynamic working fluid, is operatively connected to pump/motor 340 so as to supply additional fluid-based power to pump/motor 340.

Figure 4:
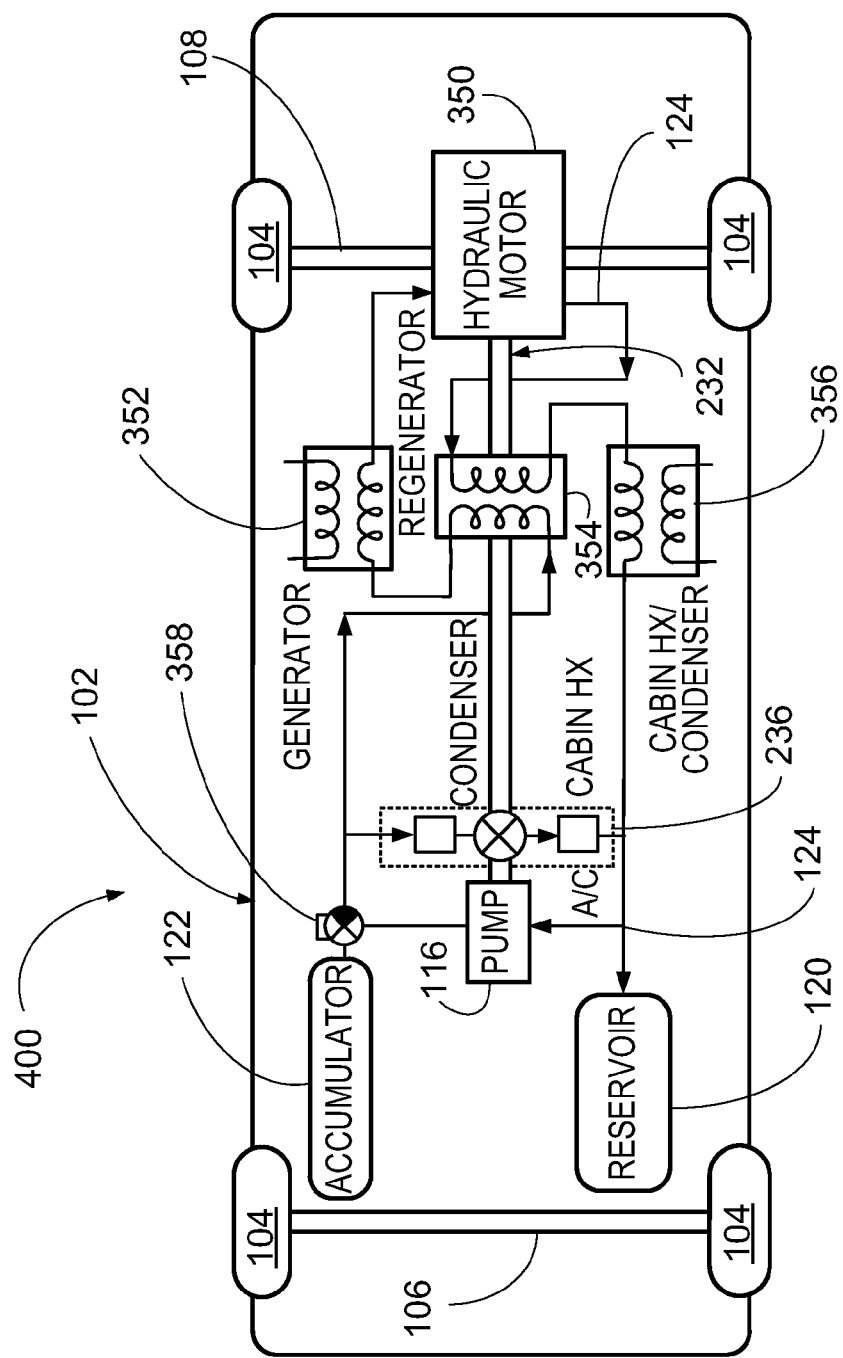
FIG. 4 is a series hybrid power system in accordance with one embodiment of the present invention that can be used alone, or in conjunction with, an internal combustion engine.

Turning to FIG. 4, system 400 of FIG. 4 is similar in many respects to system 300 of FIG. 3 except that pump/motor 340 has been replaced by an hydraulic motor 350, and combustor 344 has been replaced by generator 352, regenerator 354, and cab heat exchanger and condenser 356. Additionally, this embodiment further includes a proportional control valve 358. As can be seen from FIG. 4, system 400 not only drives motor 350 but serves to "power" cabin heating and cooling unit 236.

Figure 5:
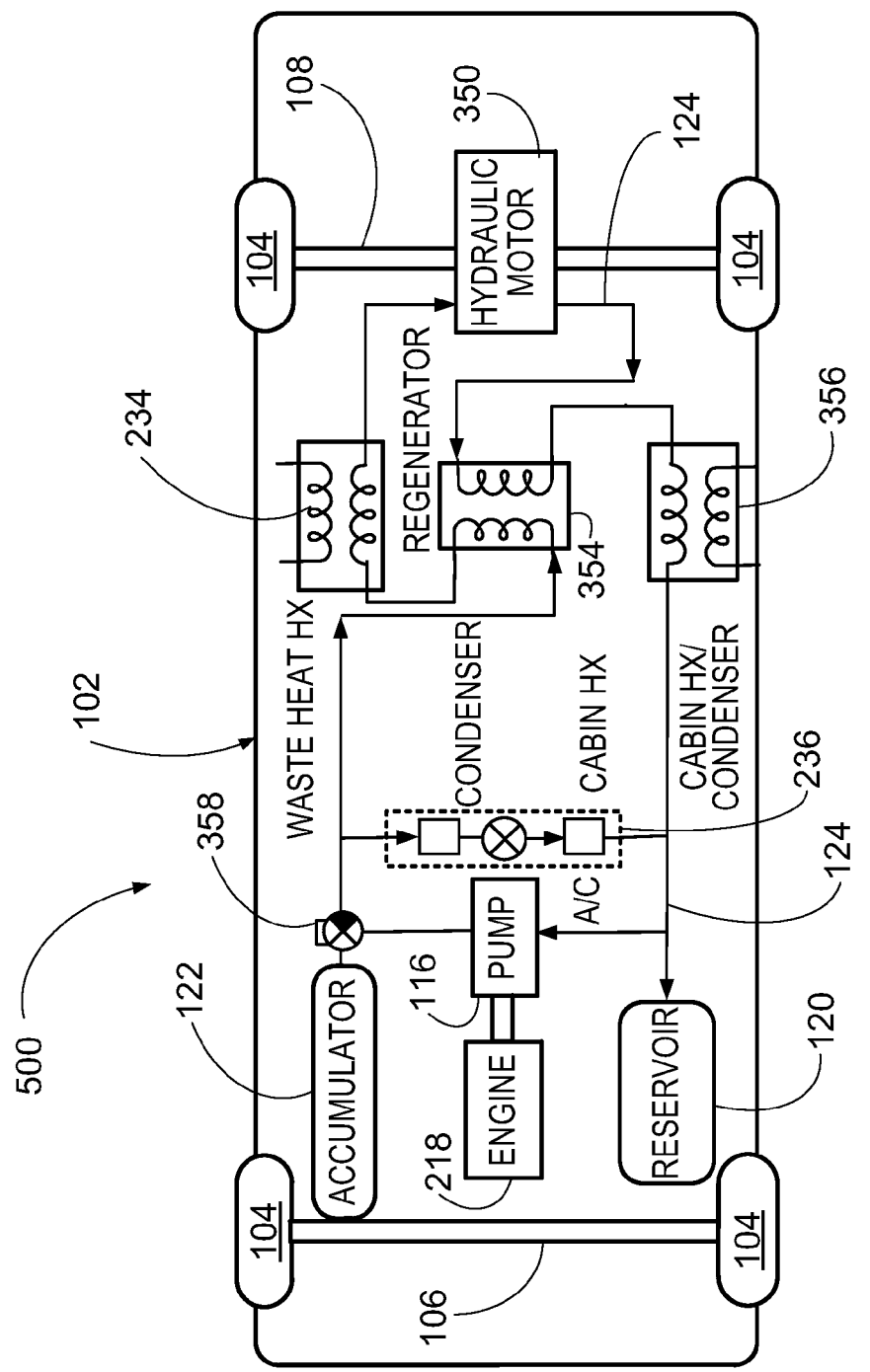
FIG. 5 is a hydraulic hybrid power system in accordance with another embodiment of the present invention.
Figure 6:
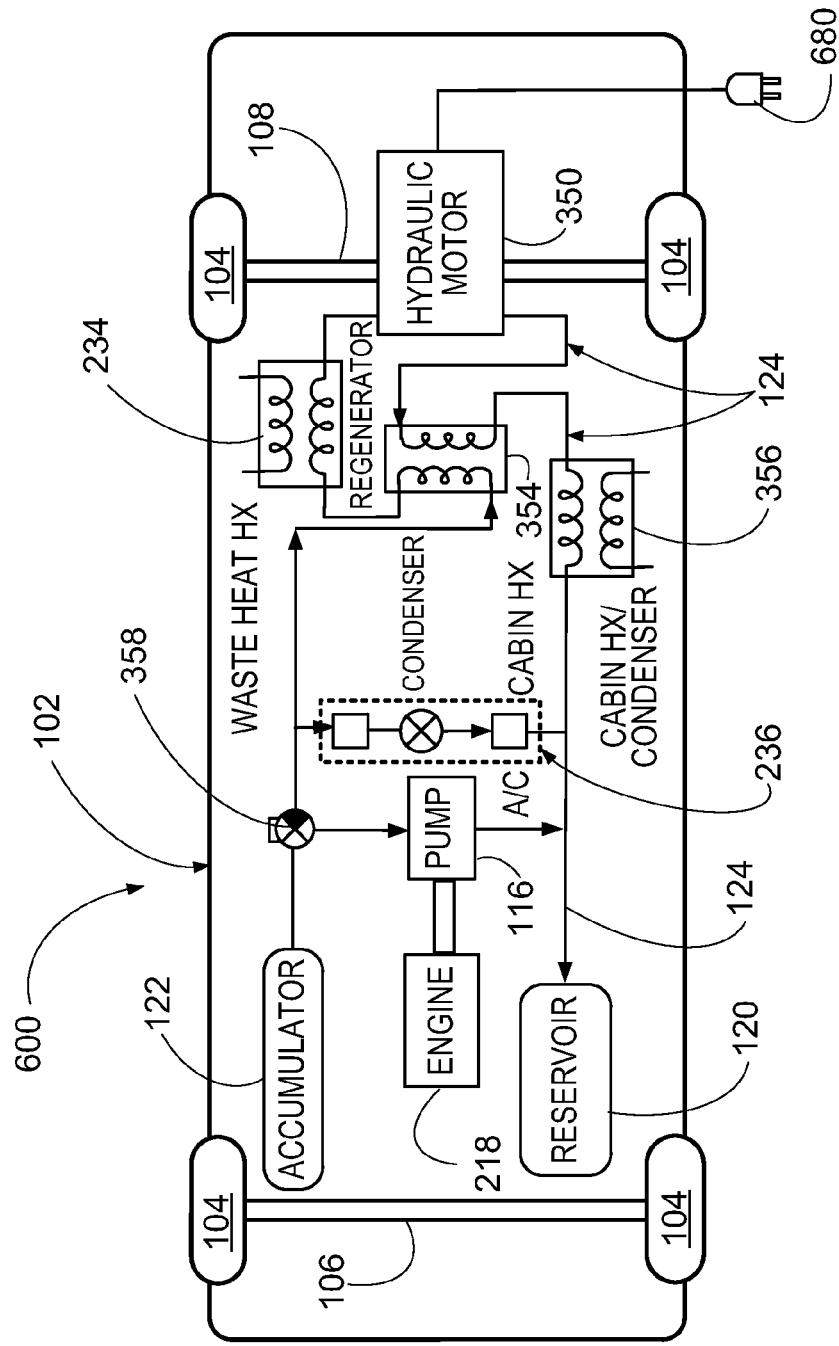
FIG. 6 is a hydraulic hybrid power system in accordance with still another embodiment of the present invention.

Turning to FIG. 5, system 500 of FIG. 5 is a combination of various elements of FIGS. 1, 2 and 3. As can be seen from FIG. 5, system 500 "powers" not only hydraulic motor 350 but also, as desired, cabin heating and cooling unit 236. In the embodiment of this Figure, engine 218 can be any suitable type of engine discussed above and acts to power, or supplement, pump 116 when needed.

Turning to FIG. 6, system 600 of FIG. 6 is nearly identical to that of system 500 of FIG. 5 except that a plug-in functionality 680 has been added in connection with hydraulic motor 350 so as to supplement the power delivered to hydraulic motor 350. The plug-in portion of system 600 can function via any suitable charge storing device such as batteries (e.g., Ni—Cd batteries or lithium ion batteries).

Figure 7:
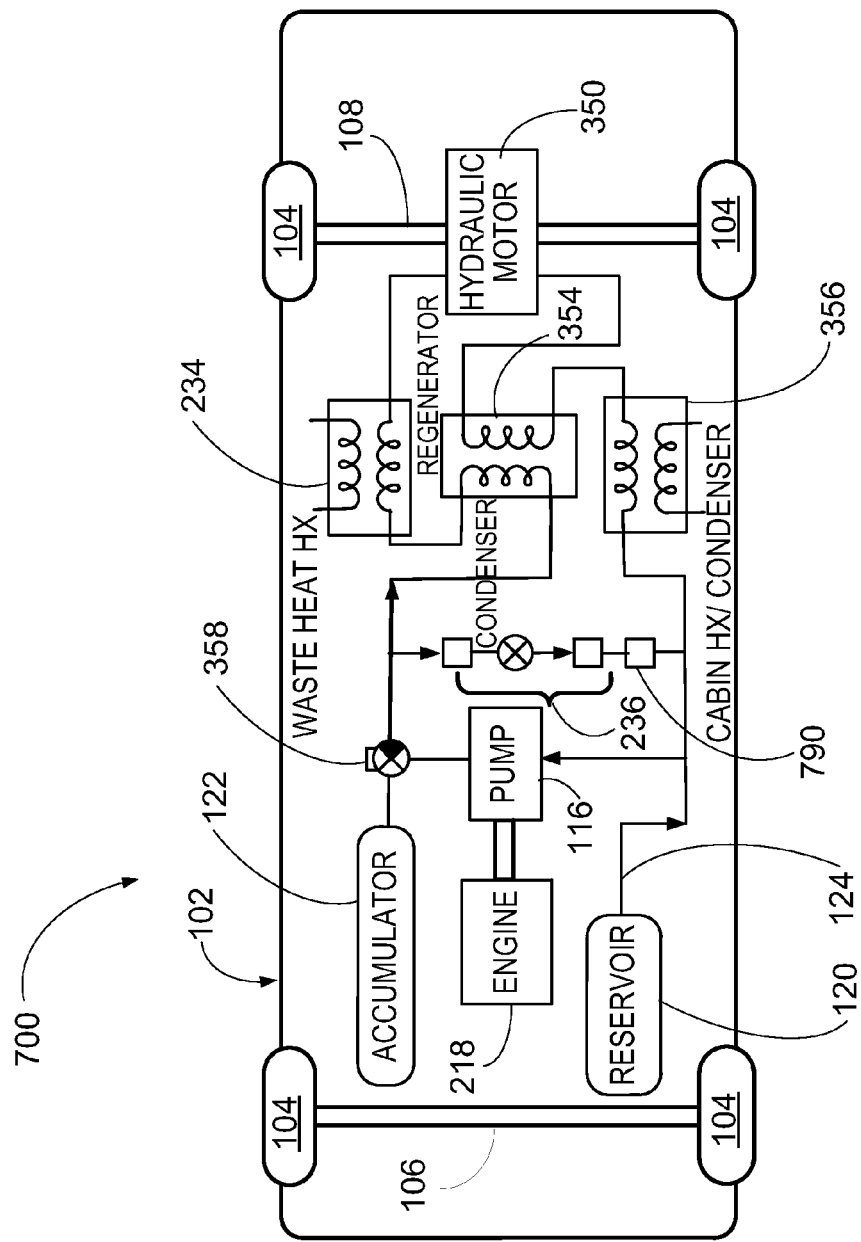
FIG. 7 is a hydraulic hybrid power system in accordance with another embodiment of the present invention.

Turning to FIG. 7, system 700 of FIG. 7 is nearly identical to that of system 500 of FIG. 5 except that a compressor 790 has been added to the system to provide pressure control to the working fluid, or fluids, of the hybrid power system.

In another embodiment, the present invention relates to a refrigeration system comprising: a vapor compressor having a working fluid (A) at an inlet pressure of (p1), wherein (p1) is less than the supercritical pressure of working fluid A, wherein the vapor compressor is hydraulically driven by a working fluid (B) at an inlet pressure (p2) and a discharge pressure (p3), wherein the working fluid (B) is comprised of at least one component being working fluid (A), and wherein the inlet pressure (p2) is greater than the supercritical pressure of working fluid (A) operable to increase energy efficiency of vapor compressor. In one embodiment, in the above refrigeration system the discharge pressure (p3) has a density (D3), wherein the inlet pressure (p2) has a density (D2), and wherein the ratio of (D3) to (D2) is less than 1.0:0.65.

In another embodiment, the above refrigeration system utilizes a working fluid (B) that is further comprised of an absorbent of the working fluid (A). In still another embodiment, the above refrigeration system utilizes a working fluid (B) that further comprises an absorbent of the working fluid (A) operable as a lubricant to the vapor compressor.

In still another embodiment, the above refrigeration system further comprises a power generating system having an expander, wherein the power generating system has a working fluid (C) comprised of at least one component including working fluid (A). In still another embodiment, the above refrigeration system utilizes a working fluid (A) that is an organic refrigerant. In still another embodiment, the above refrigeration system utilizes a working fluid (A) is an inorganic refrigerant. In still another embodiment, the above refrigeration system according utilizes a working fluid (A) is an ionic liquid.

In yet another embodiment, the above refrigeration system further comprises an absorption heat pump wherein the absorption heat pump has a working fluid (D) comprised of at least one component including working fluid (A). In still another embodiment, the above refrigeration system further comprises of a pressure amplifier. In still another embodiment, the above refrigeration system utilizes a vapor compressor that is hydraulically driven by the working fluid (B) and wherein the working fluid (B) is operable as weak solution of the absorption heat pump. In still another embodiment, the above refrigeration system further comprises a pressure amplifier wherein the weak solution pressure is increased by the pressure amplifier prior to expanding through the vapor compressor operable as a hydraulically driven device by working fluid (B) to compress the working fluid (A).

In still another embodiment, the systems of the present invention can further permit the utilization of the working fluid (e.g., thermodynamic fluid) post-expander discharge (engine circuit) or expansion valve (air conditioning circuit) to provide cooling to one or more electrical generators. In one embodiment, the generator is can be comprised of an inner rotor that is void of permanent magnets. In another embodiment, the generator has an inner rotor that is a direct double helix design. In still another embodiment, the generator is comprised of a control system that is capable of modulating the electrical/magnetic field intensity.

In one instance, the expander of a system in accordance with an embodiment of the present invention, if present, is a ramjet. In another embodiment, the expander, if present, is a rim-rotor ramjet. In still another embodiment, the expander, if present, is a rim-rotor ramjet that has a rim-rotor that is comprised of an air bearing/air-foil bearing. In one instance, the configuration of the electrical generator is such that the electrical generator inner rotor is interior to the rim-rotor inner rotor. In another embodiment, the configuration of the electrical generator is such that the electrical generator outer rotor is the rim-rotor of the ramjet. In still another embodiment, the configuration of the electrical generator is such that the electrical generator outer rotor is external of the rim-rotor of the ramjet. In still another embodiment, the system of the present invention further comprises an air bearing that utilizes the thermodynamic cycle of the working fluid.

In still another embodiment, the system of the present invention has an electrical generator designed in such a manner that the electrical generator's inner rotor and outer rotor both have diameters less than the ramjet rim-rotor, whereby either the electrical generator inner rotor or the outer rotor is connected to the ramjet output shaft, and the other is free from the ramjet output shaft.

In still another embodiment, a system in accordance with one embodiment of the present invention comprises an expander that is connected to both an electrical generator and a hydraulic pump. In yet another embodiment, a system in accordance with the present invention further comprises a control system such that the control system varies the electrical generator electrical/magnetic flux to provide a relatively constant torque between the sum of the torque from the hydraulic pump and electrical generator.

In still another embodiment, a system in accordance with an embodiment of the present invention is a power generating system with an integrated heat pump or vapor compressor in combination with at least one heat exchanger, wherein the power generating system and the heat pump or vapor compressor system utilize the same working fluid, and wherein the working fluid is pulsed into the at least one heat exchanger operable to increase the energy efficiency of the system (coefficient of performance). In one embodiment, this system comprises at least one heat exchanger that is comprised of at least two heat exchangers, and wherein a working fluid is pulsed sequentially into the at least one heat exchanger.

In still another embodiment, a system in accordance with an embodiment of the present invention is a power generating system with an integrated heat pump or vapor compressor system, wherein the power generating system and the heat pump or vapor compressor system utilize the same working fluid, and wherein the heat pump or vapor compressor system is a hydraulically driven device utilizing the same working fluid wherein the working fluid for the hydraulically driven device remains at above the supercritical pressure of the working fluid operable to increase energy efficiency of the power generating system. In one embodiment, this system utilizes a working fluid where such a fluid for the hydraulically driven device remains above the supercritical pressure of the working fluid and the working fluid at the high-side pressure of the hydraulically driven device has a density that is no greater than 35% more than the low-side pressure of the hydraulically driven device. In another embodiment, the density is no greater than 20%, or even no greater than 10%.

In one embodiment, the working fluid, or fluids, of the present invention can be further selected from the group of organic working fluids (as known in the art), HVAC refrigerants (as known in the art), inorganic working fluids including ammonia and water, and ionic liquids.

As would be apparent to those of skill in the art, the systems of the present invention, although described in relation to land vehicles (e.g., cars), is applicable to any type of vehicle.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:
1. A hybrid power generation system, comprising:
   a thermodynamic working fluid in a first thermodynamic cycle;
   a pump;
   a motor;
   a high pressure accumulator;
   a low pressure reservoir;
   a first thermodynamic cycle mass regulator operable to control the total mass of the thermodynamic working fluid within the first thermodynamic cycle;

a control system and at least one valve configured to control a mass flow of the thermodynamic working fluid into and out of the high pressure accumulator;
at least one heat exchanger;
a heat pump system in a second thermodynamic cycle; and
at least one valve configured to regulate a mass flow of the thermodynamic working fluid in the second thermodynamic cycle,
wherein the second thermodynamic cycle is configured to operate independent of the first thermodynamic cycle by drawing the thermodynamic working fluid from the high pressure accumulator;
wherein the first thermodynamic cycle has a high pressure stage at a first pressure, the second thermodynamic cycle has a high pressure stage at a second pressure, and the second pressure is less than the first pressure; and
wherein the thermodynamic working fluid comprises carbon dioxide and is in a supercritical state.

2. The hybrid power generation system of claim 1, wherein the first thermodynamic cycle has a low pressure stage at a third pressure, and the third pressure is greater than the second pressure.

3. The hybrid power generation system of claim 1, wherein the first thermodynamic cycle or the second thermodynamic cycle further comprises:
a waste heat recovery system from a combustion engine;
an expansion device;
a waste heat recovery system bypass valve; and
a condenser disposed upstream of the expansion device and downstream of the waste heat recovery system bypass valve.

4. The hybrid power generation system of claim 1, wherein at an ambient temperature, the first thermodynamic cycle has a condensing temperature, the first thermodynamic cycle has a peak high pressure temperature, and the total mass within the first thermodynamic cycle is a dynamic function of at least one temperature selected from the ambient temperature, the condensing temperature, or the peak high pressure temperature.

5. The hybrid power generation system of claim 1, wherein at an ambient temperature, the first thermodynamic cycle has a condensing temperature, the first thermodynamic cycle has a peak high pressure temperature, and the peak high pressure temperature is a dynamic function of at least one temperature selected from the ambient temperature or the condensing temperature.

6. The hybrid power generation system of claim 1, wherein the thermodynamic working fluid within a hybrid vehicle is concurrently operable to provide vehicle motion through the motor and to provide passenger cabin cooling or heating through the expansion or contraction of the thermodynamic working fluid.

7. The hybrid power generation system of claim 3, further comprising:
a waste heat recovery external heating valve operable to heat a heat transfer fluid and disposed upstream of a waste heat recovery internal heating valve.

8. A hybrid power generation system, comprising:
a thermodynamic working fluid in a first thermodynamic cycle;
a pump;
a motor;
a high pressure accumulator;
a low pressure reservoir;
a first thermodynamic cycle mass regulator operable to control the total mass of the thermodynamic working fluid within the first thermodynamic cycle;
a control system and at least one valve configured to control a mass flow of the thermodynamic working fluid into and out of the high pressure accumulator;
at least one heat exchanger;
a heat pump system in a second thermodynamic cycle;
a pressure ratio between a low pressure stage and a high pressure stage of the first thermodynamic cycle, wherein the first thermodynamic cycle has a peak high pressure temperature and the peak high pressure temperature is a dynamic function of the pressure ratio,
wherein the thermodynamic working fluid comprises carbon dioxide and is in a supercritical state.

9. The hybrid power generation system of claim 8, further comprising at least one valve configured to regulate a mass flow of the thermodynamic working fluid in the second thermodynamic cycle, wherein the second thermodynamic cycle is configured to operate independent of the first thermodynamic cycle by drawing the thermodynamic working fluid from the high pressure accumulator.

10. The hybrid power generation system of claim 8, wherein the first thermodynamic cycle or the second thermodynamic cycle further comprises:
a waste heat recovery system from a combustion engine;
an expansion device;
a waste heat recovery system bypass valve; and
a condenser disposed upstream of the expansion device and downstream of the waste heat recovery system bypass valve.

11. The hybrid power generation system of claim 8, wherein at an ambient temperature, the first thermodynamic cycle has a condensing temperature and the total mass within the first thermodynamic cycle is a dynamic function of at least one temperature selected from the ambient temperature, the condensing temperature, or the peak high pressure temperature.

12. The hybrid power generation system of claim 8, wherein at an ambient temperature, the first thermodynamic cycle has a condensing temperature and the peak high pressure temperature is a dynamic function of at least one temperature selected from the ambient temperature or the condensing temperature.

13. The hybrid power generation system of claim 8, wherein the thermodynamic working fluid within a hybrid vehicle is concurrently operable to provide vehicle motion through the motor and to provide passenger cabin cooling or heating through the expansion or contraction of the thermodynamic working fluid.

14. The hybrid power generation system of claim 9, wherein the first thermodynamic cycle has the high pressure stage at a first pressure, the second thermodynamic cycle has a high pressure stage at a second pressure, and the second pressure is less than the first pressure.

15. The hybrid power generation system of claim 14, wherein the first thermodynamic cycle has the low pressure stage at a third pressure, and the third pressure is greater than the second pressure.

16. The hybrid power generation system of claim 10, further comprising:
a waste heat recovery external heating valve operable to heat a heat transfer fluid and disposed upstream of a waste heat recovery internal heating valve.

* * * * *